June 9, 1959　　　T. LAUFFER　　　2,890,028
APPARATUS FOR MIXING LIQUIDS
Filed Oct. 20, 1955

INVENTOR

United States Patent Office 2,890,028
Patented June 9, 1959

2,890,028

APPARATUS FOR MIXING LIQUIDS

Theo Lauffer, Konigswinter (Rhine), Germany

Application October 20, 1955, Serial No. 541,748

Claims priority, application Germany October 27, 1954

4 Claims. (Cl. 259—129)

This invention relates to a high speed roller-mixing apparatus for the production of varnish colours, with which it is possible to mix the varnish liquid to great fineness and to homogenize it so that correct application thereof to surfaces is brought about and also so that the work of mixing can be carried out in a very short time.

The essential feature of the invention consists in that between a non-rotatable outer cylindrical perforated basket and a rotatable internally arranged cylindrical perforated basket, a roller bearing basket is mounted, the rollers of which roll closely upon the cylindrical rolling surfaces of the two perforated baskets so that an absolutely pure vanish liquid is produced.

The accompanying drawing illustrates an example of the preferred form of embodiment of the invention.

Figure 1:
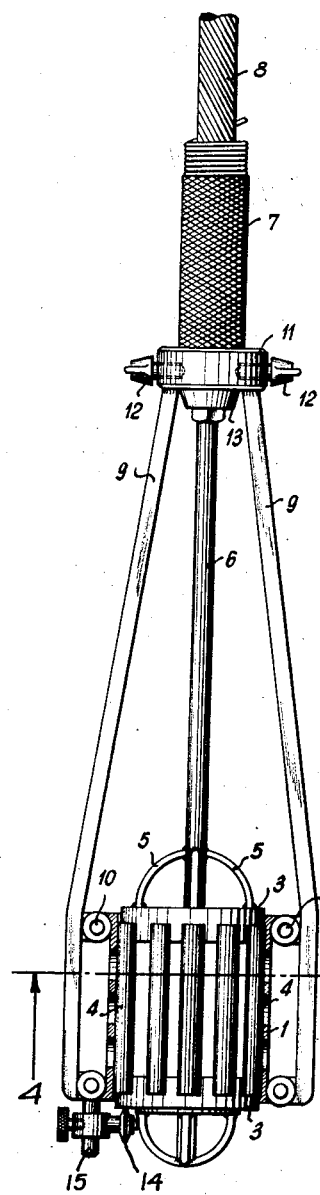
Figure 2:
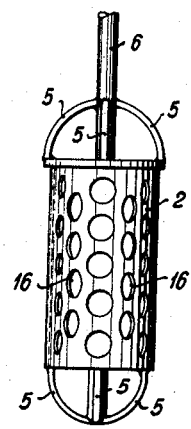
Figure 3:
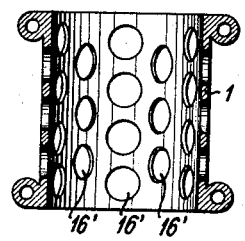
Figure 4:
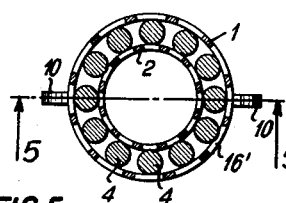
Figure 5:
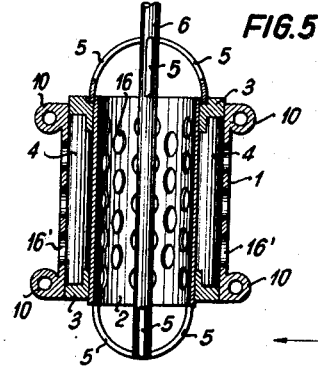
Figure 6:
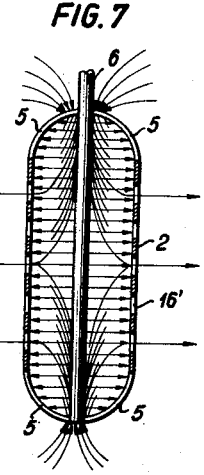
Figure 7:
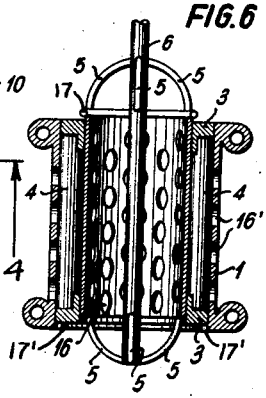

Figure 1 shows a partial longitudinal section through the high speed roller-mixing apparatus, Figure 2 shows a longitudinal elevation of the inner perforated basket, Figure 3 shows a vertical longitudinal section through the outer non-rotatable perforated basket, Figure 4 shows a cross-section along the line 4—4 of Figure 1 with retaining arms removed, Figure 5 shows a longitudinal section along the line 5—5 in Figure 4, Figure 6 shows the same section as Figure 5 with different retaining device on the perforated basket, and Figure 7 shows a longitudinal section through the inner perforated basket with arrows entered to illustrate the directions of flow.

As may be seen from Figure 1, the high speed roller-mixing apparatus consists of an external cylindrical perforated basket 1, an internal rotatable cylindrical perforated basket 2 and a roller bearing cage arranged between these two. The latter consists of two flanges 3 between which the rollers 4 are arranged in a circle as shown in Figure 4. The rollers 4 here come into contact with the cylindrical rolling surfaces of the two perforated baskets. The inner rotatable perforated basket 2 is centrally fitted into the flanges 3 of the roller bearing cage as may be seen from Figure 1. On the two ends of the inner rotatable perforated basket 2 there are arranged crossed half-rings 5 which serve as beaters during the rotation of the perforated basket 2 in the varnish liquid. They are centrally attached to the drive spindle 6 of the basket which leads through the interior of the said basket.

The arrangement as described is removably secured on a handle 7 of a flexible shaft 8 by means of retaining arms 9. For this purpose the ends of the retaining arms 9 are firmly connected, at their lower ends, in pairs with the outer perforated basket 1 by lugs 10, and at their upper ends, with a fitting adjusting ring 11, which is pushed on to the handle 7 on a cylindrical surface in a gripping fashion and secured by means of wing nuts 12. The drive shaft 6 is coupled by means of a clamping chuck 13 which is secured at the end of the flexible shaft 8 inside the handle 7 and is rotatable therein. The drive shaft 6 can also be coupled with a rigid shaft of any working machine.

In order to avoid axial displacement of the rotatable inner perforated basket 2 in relation to the outer basket 1, a small retaining wheel 14 is arranged thereon for its support. This wheel is adjustable on its securing pin 15 parallel to the drive shaft 6. The wheel 14 supports the lower flange 3 and other rotating parts during operation.

The high speed roller-mixing apparatus is utilised by immersion thereof into the varnish liquid and stirring, so that the liquid on the one hand, penetrates axially into the apparatus, passes through the holes 16, 16' therein between the working cylinder faces of the perforated baskets, when a thorough rolling and homogenization of the varnish liquid takes place due to the rotation.

Impellers can also be arranged in place of the rings 5.

Figure 6 shows another construction of the retaining arrangement for the roller basket including the rollers 4 and flanges 3. This arrangement consists in placing a slip ring 17 upon the upper outer edge of the inner rotatable perforated basket 2, similarly inserting a slip ring 17' in the lower inner edge of the outer stationary perforated basket 1. After introduction of the inner rotatable perforated basket 2 into the roller cage 3, 4, the latter is held in the inner perforated basket 2 at the top by the slip ring 17 on the outside, so that displacement of the roller cage 3, 4 is only possible in the range of about 1–2 mm. there provided. Upward movement of the cage is prevented by the fastening of the rings 5 outside the basket 2 and in the path of flange 3 (Figs. 2 and 5) or by the ring 17 (Fig. 6).

Additional suction effect can be produced in case of need or in the case of low speed of rotation of the apparatus, by the arrangement of two helical vanes at top and bottom, both exerting a pressure effect towards the interior of the perforated basket.

If the perforated basket 2 equipped with half-rings 5 according to the enclosed drawing, Figure 7, is set in rotation (about 3,000 revolutions per minute) in a varnish mass or the like, then due to the centrifugal force all the mass situated in the the inner perforated basket 2 is projected outwards through the holes. Thus a vacuum space is produced in the perforated basket into which the varnish mass situated outside is compelled to penetrate. In the case of relatively large diameters, this is not possible, due to the centrifugal force occurring. In the "core" of the inner rotating perforated basket 2 the centrifugal force is equal to zero and thus free space for flowing in is given to the mass.

It is further observed that the half-rings 5 have an additional pre-rubbing and disintegrating effect when the mass flows in. It will be apparent that the inner basket will be rapidly rotated by shaft 6 during operation. The cage comprising the flanges 3 and the rollers 4 will rotate but at a lesser speed. The rollers will have a planetary movement, rolling over the fixed surface of the outer basket 1 and at the same time over the rotating surface of the inner basket 2. The peripheral speed around the basket 2 will be materially greater than around the outer basket 1. This will result in a pumping action from the center outward. As the fluid passes through the holes in the inner basket it is forced past the rollers and at the speed attained, there is a material centrifugal effect (Fig. 7). At the same time the fluid and any solid particles are milled between the outer surface of basket 2 and the rollers. The same effect is produced between the rollers and the inner surface of basket 4 prior to the pressure of the material through the holes in the latter. The aggregate result is both milling and mixing with an induced centrifugal flow through the apparatus.

I claim:
1. In a portable high speed dipping roller apparatus for mixing liquids, the combination of a non-rotary outer cylindrical perforated basket, a rotatable inner cylindrical perforated basket arranged co-axially within said outer basket, a roller-carrying cage disposed between said inner and outer baskets, and a plurality of rollers carried by said cage and rotating about axes parallel to the common axis of said inner and outer baskets, the surfaces of said rollers rolling upon the outer surface of said inner basket and the inner surface of said outer basket.

2. In an apparatus for mixing liquids, the combination as claimed in claim 1, comprising also long holding arms secured to said outer basket, a handle detachably secured to said holding arms, a flexible drive shaft axially carried within said handle, a rigid drive shaft connected to said inner basket, and disengageable coupling means disposed for selectively coupling said rigid drive shaft to said flexible drive shaft.

3. In a portable immersible apparatus for mixing liquids, the combination of a non-rotary outer perforated basket, a rotatable inner perforated basket coaxial with said outer basket, a drive shaft for the inner basket, crossed arms radially connecting the shaft to each end of the inner basket, a cage between said baskets and a series of rollers in the cage engaging the adjacent surfaces of the baskets.

4. In an apparatus for mixing liquids, the combination as claimed in claim 2 comprising also a small adjustable retaining wheel mounted on the outer basket for engaging the lower end surface of said cage and preventing axial displacement of said cage and inner basket.

References Cited in the file of this patent
UNITED STATES PATENTS

| | | |
|---|---|---|
| 1,015,337 | Pancoast | Jan. 23, 1912 |
| 1,891,165 | Knupffer | Dec. 13, 1932 |
| 1,954,093 | Nelson | Apr. 10, 1934 |